United States Patent [19]

Macmillan

[11] 4,321,669
[45] Mar. 23, 1982

[54] MICROCOMPUTER NETWORK HAVING SEVERAL MICROCOMPUTER MODULES WHICH ARE COUPLED ONTO AT LEAST ONE SYSTEM BUS

[75] Inventor: Richard Macmillan, Kolbermoor, Fed. Rep. of Germany

[73] Assignee: Siemens Aktiengesellschaft, Berlin & Munich, Fed. Rep. of Germany

[21] Appl. No.: 83,468

[22] Filed: Oct. 10, 1979

[30] Foreign Application Priority Data

Oct. 27, 1978 [DE] Fed. Rep. of Germany ....... 2846925

[51] Int. Cl.³ .......................... G06F 9/46; G06F 15/16
[52] U.S. Cl. ................................................... 364/200
[58] Field of Search ... 364/200 MS File, 900 MS File; 371/15, 16

[56] References Cited

U.S. PATENT DOCUMENTS

| 3,445,822 | 5/1969 | Driscoll | 364/200 |
| 4,063,311 | 12/1977 | Jeremiah et al. | 371/16 X |
| 4,085,448 | 4/1978 | Kogge | 364/900 |
| 4,123,794 | 10/1978 | Matsumoto | 364/200 |
| 4,130,864 | 12/1978 | Schlotterer | 364/200 |
| 4,130,865 | 12/1978 | Heart et al. | 364/200 |
| 4,153,934 | 5/1979 | Sato | 364/200 |

Primary Examiner—Mark E. Nusbaum
Assistant Examiner—Eddie P. Chan
Attorney, Agent, or Firm—Hill, Van Santen, Steadman, Chiara & Simpson

[57] ABSTRACT

In a microcomputer system resource and priority testing of modules is provided by first testing for readiness to exchange information via all modules, then testing for the priority assigned to the modules in which flags and registers are operated in a defined sequence to switch bus connections to the various test and data lines.

6 Claims, 3 Drawing Figures

MICROCOMPUTER NETWORK HAVING SEVERAL MICROCOMPUTER MODULES WHICH ARE COUPLED ONTO AT LEAST ONE SYSTEM BUS

BACKGROUND OF THE INVENTION

1. Field of the Invention

The present invention relates to a microcomputer network which has several microcomputer modules which are coupled onto at least one bus system and which, in each case, contain at least one test circuit for testing each module, the test circuit requiring an access to the system bus independently of whether all other modules are ready for information transmission, and for testing to determine which initiator has the highest priority with respect to all other modules which also appear, in the case that a resource test has indicated the readiness for an information transmission.

2. Description of the Prior Art

In the case of transmission of information (data, identifiers, and commands) between microcomputers, hereinafter simply termed microcomputer modules or, simply, modules, of a microcomputer network, it is possible that all of the advantages of the resolution of the system program in the microcomputer network in parallel designed segments lose their meaning if the access process proceeds two slowly to the interface which is given by the system bus.

The access process has heretofore been carried out in a typical manner with software with the help of a monitoring processor. Requests from all modules in the microcomputer network are stored in the monitoring processor, whereby their priorities are checked. The requests normally serve for the continuation of a program portion in at least one other module. Continuations of this sort, which are to be seen as tasks for the module or the other modules, are then assigned to waiting modules by means of the decisions of the monitoring processor. A software process of this sort is, in general, very time consuming.

SUMMARY OF THE INVENTION

The present invention is based upon the problem of providing a fast hardware solution for systems of the type outlined above.

This problem is solved for a microcomputer network of the type set forth above, according to the present invention, by providing a number of connections (module connections) corresponding to the number of modules in the microcomputer network, the connections being connected to the system bus and to a predetermined connection which, in each case, carries a signal which characterizes the resource testing, or respectively, the priority testing (resource/priority connection). A status connection is provided which in each case carries a signal which characterizes an information transmission, or respectively, a non-occurring information transmission. In each case a resource line and a priority line per module connection are provided, along with a priority request line which is associated with the resource/priority connection, as well as in each case an information transmission line which is associated to a respective module connection or, respectively, to the resource/priority connection. An information transmission flag-register (hereinafter designated "flag") is provided which is selected by means of a signal which indicates an information transmission, and which switches the status connection to the signal which characterizes a non-occurring information transmission in the case of the presence of the signal which indicates information transmission. The flag is coupled to the resource lines or, respectively, the priority lines by way of a electronic switch (hereinafter designated "switch") and is coupled to the data lines by way of another switch. An activity flag is coupled to the resource lines by way of switches and is selected by means of the signal which characterizes active processing, or respectively, completed processing in the module. A module identification register is coupled to the resource lines by way of switches and is also connected by way of switches to the priority lines. A flip-flop is selected by the resource/priority connection and is coupled to the resource lines by way of switches and by way of other switches to the priority lines, whereby the module connections are switched via the resource lines to a signal which characterizes a successful resource testing, if the status connection is switched to the signal which characterizes a non-occurring information transmission. The activity flip-flop releases a signal which characterizes a closed operation if the identification register is set to a signal combination which characterizes the modules and the flip-flop which is selected by the resource/priority connection obtains from the signal which characterizes the resource testing. Comparison logic is provided to compare a signal combination which is input and which characterizes a combination of initiator modules and resource modules with the signals at the module connections and, as a function of this comparison, releases a signal which characterizes these elements in the case of successful resource testing. A priority request flag is selected by the signal which characterizes a successful resource test and by an information transmission request signal and switches the resource/priority connection onto the signal which characterizes the priority testing in the case of successful resource testing, whereby again, the flag which is selected by this operation is switched over to the effective circuit of the priority lines such that the module connections can be switched over to a signal which characterizes the priority of the initiator modules. A plurality of additional switches is provided these additional switches are selected by the module connections and switched over from, in each case, one module connection which is associated with a module onto, in each case, at least one priority line which is associated with another module such that a priority ranking sequence of the modules is provided, and in which, in the case of the priority testing, except for the priority line of an initiator module with the highest priority in the ranking sequence, the priority lines of all other possible initiator modules are circuited to be ineffective.

It is possible with a test circuit which is provided in the modules of a microcomputer network of the kind defined above to carry out the necessary connection between the modules after release of the interface, which is provided by the system bus, in two clock cycles, if all participating modules are ready for the transmission of a task. If, for example, the machine cycle amounts to 300 nanoseconds, then the necessary connection between modules can be carried out in two clock cycles, that is, in 600 nanoseconds.

According to the invention, the resource lines, the priority lines and the corresponding data lines are coupled by way of NOR gates with the connections which characterize the modules and the remaining information transmission line, as well as the output of the priority request register is coupled via a NOR gate with the source-priority connection.

Also, according to the present invention, the comparison logic includes a flip-flop, in each case, per module connection, into which a signal combination can be fed for the module, which signal combination is set by the modules which are determined as initiator modules or as resource modules, and at the outputs of the flip-flops, NOR gates are connected with one input, whose other input(s) are coupled to the module connections, so that, by means of the NOR gates, the signal combination which is fed into the flip-flops are comparable with the signals which result from a resource test at the module connections, and at the outputs of the NOR gates, a further NOR gate is coupled, which emits a corresponding signal for the selection of the priority request flag.

In addition, and according to the present invention, a NOR gate which is coupled to the priority lines has an output which is coupled to the information transmission flag and the priority request register and, after a priority testing in an initiator module with the highest priority, activates the information transmission flag to feed the information transmission lines, whereby the status connection switches to the signal which characterizes an information transmission.

Also, and in accordance with the present invention, the switches which activate the resource lines, the priority lines and the data lines are formed by switching transistors, by way of which the lines which lie at a prescribed voltage can be short-circuited against a reference potential.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
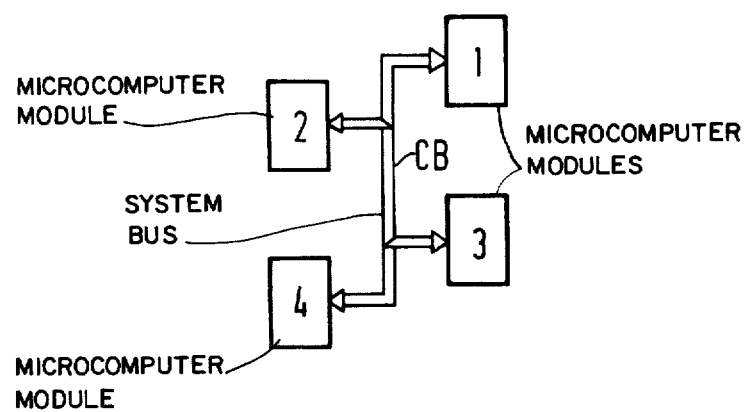
FIG. 1 is a schematic representation of a microcomputer network having four modules which are coupled onto a system bus.

FIG. 1 illustrates an embodiment of a microcomputer network having four modules 1-4, which in each case represent a microcomputer. These modules are coupled to a common system bus CB.

Figure 2:
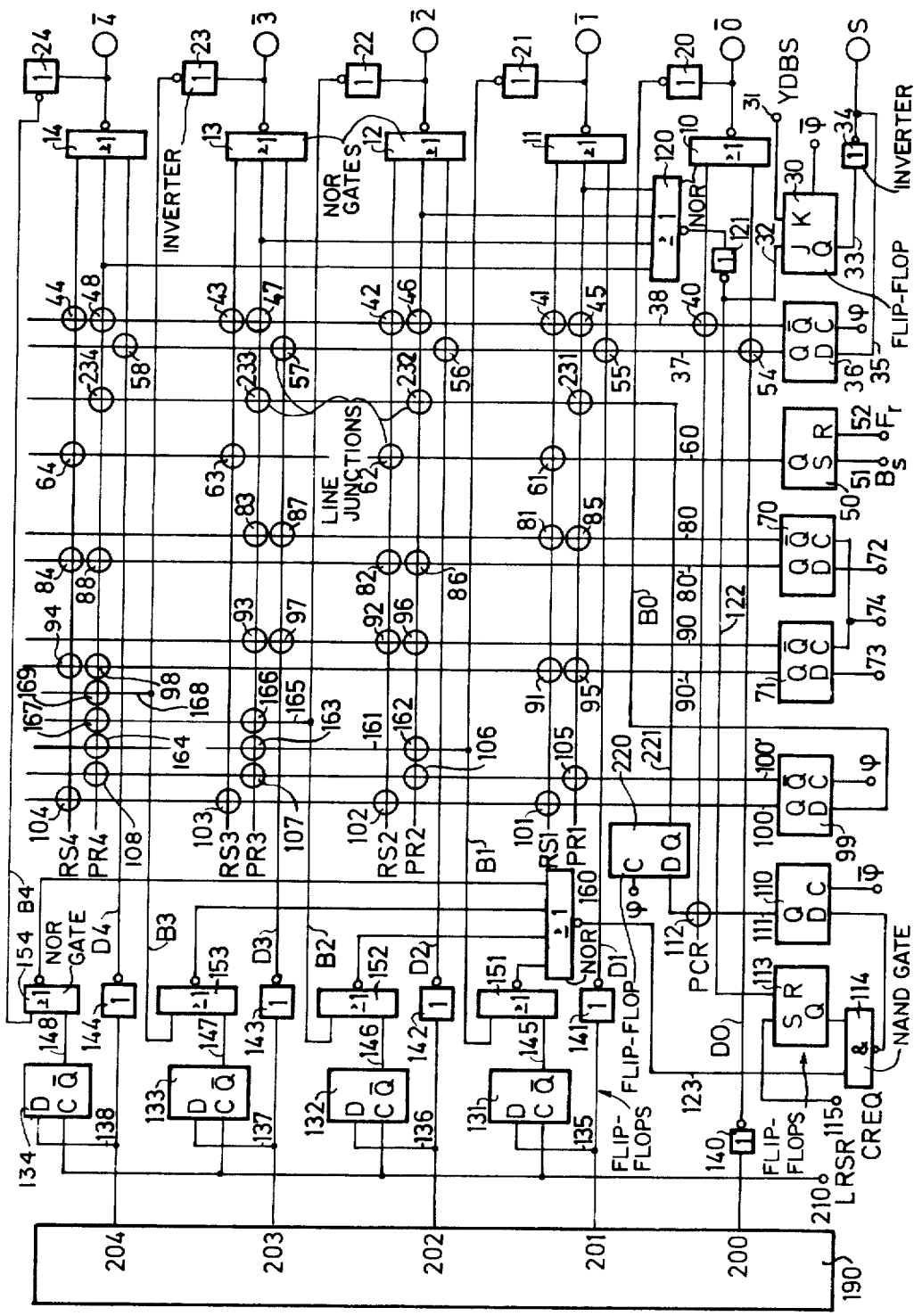
FIG. 2 is a schematic circuit diagram of an embodiment of a test circuit constructed in accordance with the present invention.

For communication between the modules 1-4, in each of these modules at least one test circuit is provided, for which an embodiment thereof is illustrated in FIG. 2.

Referring to FIG. 2, a testing circuit is illustrated of the type which is present, at least once, in each module. If one is concerned with a configuration of the modules according to FIG. 1, then each module 1-4 contains a circuit arrangement of the type illustrated in FIG. 2. It is nevertheless also possible that a additional bus extends from each module of FIG. 1 to further modules (not illustrated). Then, each module 1-4 also contains still further circuit arrangements of the type illustrated in FIG. 2. Generally, it is to be determined that for each bus which extends from, or respectively, to a module, in each case a circuit arrangement according to FIG. 2 is present in the module.

With the circuit arrangement according to FIG. 2, for a transmission of information (data, identification signals, commands) between modules, two general operations can be carried out:

1. For each module which requires access to the interface provided by the bus, a check is made to determine whether all other requested modules (partners or resources) are ready for transmission; and 2. If the test according to 1 shows that the preparation for transmission is present, then testing is carried out as to which requesting module, the partner of which is ready for transmission, possesses the highest priority with respect to all other requesting modules.

A circuit arrangement found in a module according to FIG. 2 is coupled to the bus CB which couples the modules with one another (see FIG. 1) via connections S, $\overline{0}$, $\overline{1}$, $\overline{2}$, $\overline{3}$, $\overline{4}$. The embodiment illustrated in FIG. 2 is suitable for four modules which are in communication with one another. The connections $\overline{1-4}$ in each case represent a connection for a respective module (for example, 1-4 according to FIG. 1). The connection designations $\overline{0-4}$ are designated "inverted" because, in the case of the present embodiment, it is a matter of a "active low" embodiment, that is, the bit "0" at one of the connections $\overline{1-4}$ represents the readiness for communication of a module, whereas the bit "1" represents the lack of readiness for communication of a module. This will be explained in greater detail below. The connection S is provided for a status line in the bus, the meaning of which will also be explained in greater detail below.

The connections $\overline{0-4}$ which are coupled to the bus CB serve also for carrying out the testing for transmission readiness, as well as the priority testing for the transmission of information between the modules. For carrying out the functions of the circuit arrangement, in particular, of the testing of the transmission, or, respectively, communication readiness (in the following called resource testing), of the priority testing which follows resource testing, as well as of the information transmission, in each case, three lines are associated with the connections $\overline{1-4}$ for the modules ($\overline{1-4}$, FIG. 1), which lines are coupled to the connections 1-4 by way of a respective NOR gate 11-14, which is designed as an "open-collector", or, respectively, an "open drain" circuit. Thereby, it is a matter of the lines RS1-RS4 for the source testing, lines PR1-PR4 for the priority testing, as well as lines D1-D4 for information transmission. As an information transmission line, a further line D0 is provided, which is coupled to the connection $\overline{0}$ by way of a NOR gate 10 which is also designed as an open collector or an open drain circuit.

In the following, the function of the circuit arrangement in the case of resource testing will be described. Proceeding from the fact that possible communications between the modules have terminated and, as a result of termination, no information transmissions are being carried out over the communications bus CB (FIG. 1). This state is signaled by means of the signal YDBS which is delivered by means of a module acting as the initiator in the case of a communication. The signal YDBS is fed to an input K of a JK flip-flop 30 by way of a connecton 31 and switches the flip-flop 30 into a logic state in which a logic signal "0" is provided at the output Q. This "0" signal is inverted by an inverter 34 connected to the output Q of the JK flip-flop 30 and designed as an open collector or open drain circuit, so that a logic "1" is fed to an input D of a D flip-flop 36, which is selectable at a clock input C by means of a clock signal $\phi$. By means of the "1" signal at the input D of the flip-flop 36, the flip-flop 36 is switched such that the output Q has a "1" signal thereat and the output $\overline{Q}$ has a "0" signal thereat upon receipt of the clock signal $\phi$. A line 37 extending from the output Q of the flip-flop 36 therefore carries a "1" and a line 38 extending from the output $\overline{Q}$ carries a "0". Examining first the line 38, the same forms junctions 41–44 with the lines RS1–RS4 for the resource testing, as well as a junction 40 with a line PCR which leads to one input of a NOR gate 10. The meaning of the line PCR will be explained further below. In addition, the line 38 forms junctions 45–48 with the lines PR1–PR4 for the priority testing. As to the design of the junctions 40–44 and 45–48, which will be explained in greater detail with reference to FIG. 3, it will only be said here that the same is a matter of gates which allow a "1" signal to arise at the corresponding inputs of the NOR gates 10–14 when a "0" is received. This also only applies when further junctions which are still to be explained also obtain a "0" signal. If a "0" signal is available at the output $\overline{Q}$ of the flip-flop 36 because of the previously explained switching processes, then the condition is fulfilled for the junctions 40–44.

The circuit arrangement according to FIG. 2 further contains a RS flip-flop 50, which is selectable by way of a connection 51 at its set input S with a signal $B_s$, which indicates whether the corresponding module is still busy with a task. By way of a further connection 52, the flip-flop 50 is selectable at its reset input R with a signal $F_r$ which indicates that the corresponding module has terminated a task.

It will be assumed here that the corresponding module is not carrying out a task, so that the flip-flop 50 is reset at its reset input R by a signal $F_r$ and that a "0" signal is provided at its output Q.

A line 60 extends from the output Q of the flip-flop 50 and forms junctions 61–64 of the type generally explained above with the lines RS1–RS4 for the resource testing. With this, in the case of a reset flip-flop 50, the junctions 61–64 are provided with a "0" signal by way of the line 60.

For identification of the individual modules, the circuit arrangement contains a register which has two D flip-flops 70 and 71. The flip-flops 70 and 71 are selectable at their D inputs with logic signal combinations which identify the modules and which are formed by two bits. Signal combinations which are formed by two bits apply for the case of four modules 1–4 which was presumed according to FIG. 1. For a larger number of modules, the number of bits in the register correspondingly increases. For example, combinations with three bits could identify up to eight modules. The bit combinations are fed to connections 72 and 73, whereas clock inputs C of the flip-flops 70 and 71 are selectable by way of a connection 74. From the outputs Q and $\overline{Q}$ of the flip-flops 70 and 71, a pair of lines 80 and 80′ extend from the flip-flop 70 and a pair of lines 90 and 90′ extend for the flip-flop 71. The input bit combination at the connections 72 and 73 are related to the output combinations at the flip-flop outputs as follows:

| Inputs | | Flip-Flop 70 | | Flip-Flop 71 | |
|---|---|---|---|---|---|
| 73 | 72 | Q | $\overline{Q}$ | Q | $\overline{Q}$ |
| 0 | 1 | 1 | 0 | 0 | 1 |
| 1 | 0 | 0 | 1 | 1 | 0 |
| 1 | 1 | 1 | 0 | 1 | 0 |
| 0 | 0 | 0 | 1 | 0 | 1 |

The flip-flops 70 and 71 form the call number of the module by means of the respective binary combinations, which corresponds to the numeric character of the connection $\overline{1}$–$\overline{4}$ in each case. (exception: "4" is designated here as "00")

The lines 80 and 80′ form junctions 81–84 with the lines RS1–RS4 for the resource testing, corresponding to these bit combinations. The lines 90 and 90′ correspondingly form junctions 91–94 with the lines RS1–RS4. The function of the junctions 85–88 of the lines 80 and 80′ and the junctions 95–98 of the lines 90 and 90′ with the lines RP1–PR4 for the priority testing will be explained in the following.

One observes from the cited bit combinations that in each case, at the junctions 81, 91; 82, 92; 83, 93; and 84,94 for the corresponding module, in the case of the bit combination which characterizes the same, always a "0" is provided at the connections 72 and 73. If, for example, one perceives the circuit arrangement of FIG. 2 to be provided in the module 1 according to FIG. 1, for which a "0" signal which indicates its communication readiness is emitted by way of the connection $\overline{1}$, the bit combination which characterizes this condition at the inputs 73 and 72 is 01. Then, in each case, a "0" signal is provided at the junctions 81 and 91. The corresponding situation applies according to the above table for modules 2–4, for which in each case a "0" signal indicating their communication readiness is emitted by way of the connections $\overline{2}$, $\overline{3}$ and $\overline{4}$.

A D flip-flop 99 has an input D which is connected by way of an inverter 20 to the connection $\overline{0}$. The flip-flop 99 is activated at a clock input C with a clock pulse $\phi$. A line 100 extends from an output Q of the flip-flop 99 and forms junctions 101–104 with the lines RS1–RS4 for the resource testing, whereas a line 100′ extends from the output $\overline{Q}$ to form junctions 105–108 with the lines PR1–PR4 for the priority testing. As will follow from the following embodiments, in each case of the priority testing, a "1" signal is available at the connection $\overline{0}$, and is inverted by way of the inverter 20, so that the flip-flop 99 is in a logic state providing a "0" at the output Q and a "1" at the output $\overline{Q}$. Thereby, for the priority testing, the condition is fulfilled that a "0" is available at the junctions 101–104.

In the circuit arrangement according to FIG. 2, two further flip-flops are provided, namely a D flip-flop 110 and a RS flip-flop 113, whereby the D flip-flop 110 from its output Q functions by way of a line 111 and a junction 112 onto a control line PCR for a transition from resource testing to priority testing. The control line PCR leads to an input of the NOR gate 10.

Further, the flip-flop 110 is selected as a control input C with an inverted clock pulse $\overline{\phi}$. The D input of the flip-flop 110 is selected by way of a NAND gate 114 by the output Q of the RS flip-flop 113. The flip-flop 113, for its part, is selected at its set input as by a connection 115 with a signal CREQ, which is generated in a module which functions as a communication initiator, that is, this module seeks to enter into interaction with further modules, whereby, it can function as a sender or a receiver. A reset input R of the flip-flop 113 is selected by the NOR gate 120 with four inputs, which lie at the lines PR1-PR4 for the priority testing, by way of an inverter 121 and a line 122.

A further input of the NAND gate 114 is selected by way of a line 123 by a NOR gate 160.

A resource register having four D flip-flops 131-134 is provided for the selection of the NOR gate 160. The highest number of modules at the bus CB according to FIG. 1 is determined by the number of these flip-flops. The four flip-flops 131-134 receive input signals 201-204 at their respective D inputs from the module via a buffer 190 having five outputs 200-204 which determine the partner modules in a communication and therefore possess call numbers, which are identical to the call numbers of the resource modules. For example, the flip-flop 133 corresponds to the module 3 (FIG. 1) as a resource. The outputs 200-204 of the buffer 190 are coupled onto the data lines D0-D4 by way of respective open-drain inverters 140-144. The lines 135-138 extend ahead of the inverters 141-144 directly from the buffer to the D inputs of the flip-flops 131-134. The signals on the lines 135-138 are clocked by way of a clock signal LRSR from a connection 210 by way of clock inputs C of the flip-flops 131-134. The outputs $\overline{Q}$ of the flip-flops 131-134 are connected by way of respective lines 145-148 to an input of a respective NOR gate 151-154. The connections $\overline{1}$-$\overline{4}$ are connected by way of respective inverters 21-24 and respective lines B1-B4 to another input of the respective NOR gates 151-154. The outputs of the NOR gates 151-154 are connected to a NOR gate 160, whose output is connected to an input of the NAND gate 114 by way of the line 123.

For the following embodiments, it will be assumed that the module 4 is an initiator which requests a communication with the modules 1-3, which are then assumed to be resources. It is further assumed that the module 2 is also an initiator which requests a communication with the modules 1 and 4.

For the circuit located in the module 4 according to FIG. 2, with the above assumptions, the flip-flops 131-133 are set such that a "0" signal is available on the lines 145-147. The flip-flop 134 remains reset, that is, the line 148 carries a "1" signal. In the module 2, the flip flops 131 and 134 are set, whereas the flip-flops 132 and 133 are reset. The contents of the resource register in the modules 1 and 3 are of no significance in this example, since these modules only represent resources.

If one proceeds from the assumption that no communication is present in the microcomputer network, then the connection S has a "1" thereat, since the end of the communication is indicated at the input 31 by a YDBS signal having the value "1". The flip-flop 113 is reset because of the preceding communication, so that the line 111 carries a "1" signal and the line PCR carries a "0" signal. The line 37 also carries a "1" signal, because a "1" signal is available at the connection S. With this condition, a "1" signal is also present at the connection $\overline{0}$.

The flip-flop 50 indicates whether a module is still carrying out (executing) a task. If the module 3 is carrying out a task, then the flip-flop 50 is set at the input 51 by way of the signal $B_s$, so that the line 60 carries a "1" signal, that is, the junction 63 in the module 3 inhibits. With this, then the resource line RS3 carries a "0". The data line D3 is also blocked, because the connection S has a "1" thereon and the flip-flop 36 is set correspondingly. Since the connection $\overline{0}$ stands at "1", the line 100' carries a "1" signal, whereby the priority line PR3 is blocked. Since with this condition all inputs of the NOR gate 13 have a "0" signal applied thereto, the connection $\overline{3}$ carries a "1" signal. This signal is passed on to all of the other modules 1, 2 and 4.

If the module 3 is not carrying out (executing) a task, then the line 60 at the input 52 of the flip-flop 50 is set at "0" by way of the signal $F_r$, so that the connection $\overline{3}$ carries a "0".

The connections $\overline{1}$ and $\overline{2}$ also carry a "0" because the modules 1 and 2 are presumed to be ready for communication.

For the case in which the module 3 carries out (is executing) a task, the connections $\overline{1}$ and $\overline{2}$ carry a "0" and the connection $\overline{3}$ carries a "1". The signal at the connection $\overline{4}$ is of no significance in this example, since the module 4 is not a resource.

Then, the lines B1 and B2 carry a "1" in the module 4, so that the outputs of the NOR gates 151 and 152 each provide a "0". Because the line 148 carries a "1" signal, the output of the NOR gate 154 also provides a "0". With the connection $\overline{3}$ carrying a "1", the line B3 carries a "0" signal. Since the module 3 is considered to be a resource, the line 147 carries a "0" signal, and, because of this, the output of the NOR gate 153 carries a "1" signal. The output of the NOR gate 160, and with this, the line 23, carry a "0" signal.

Then, a priority testing cannot take place, because the line 111 remains at "1". The priority lines PR1-PR4 are then blocked by means of a D flip-flop 220, which is selected by way of the line 111, as well as a line 221 which extends from the output Q by way of the junctions 231-234.

If the module 3 is not carrying out (executing) a task, then the connection $\overline{3}$ goes to "0". With this, the output of the NOR gate 153 carries a "0" signal, and the same occurs at the outputs of the NOR gates 151, 152 and 154. Since all outputs of the NOR gates carry "0's", the line 23 now carries a "1" signal.

Since the module 4 declares itself to be an initiator by means of a signal CREQ at the input 115, the flip-flop 113 is set and causes a "0" at the output of the NAND gate 114. This causes the flip-flops 110 and 220 (delayed by half a clock cycle by means of the time pulse signal $\phi$) are also set to "0".

Now the resource test is terminated, allowing the priority test to take place.

Since the line 111 carries a "0" signal with the flip-flop 110 set to "0", the line PCR goes to a "1" by way of the junction 112, and therewith, the connection $\overline{0}$ goes to "0". The resource lines RS1-RS4 are blocked (inhibited) by way of the junctions 101-104. The priority lines PR1-PR4 are potentially released by way of the junctions 105-108.

Since the module 1 is not an initiator, no resource testing has taken place with respect thereto because of the lack of the signal CREQ at the input 115. The same applies for the module 3. Therefore, the flip-flop 220 remains set a "1" in these modules, whereby its priority lines PR1-PR4 remain blocked.

If the module 1 were an initiator, then it would have the highest priority, since no signals from other modules can block the release of the priority line PR1. The connection $\overline{1}$ would then carry a "0" signal, which produces a "1" signal on the line B1 by means of the inverter 21. With this, the priority lines PR2-PR4 would be blocked by way of the line 161 as well as the junctions 162-164. Correspondingly, the priority lines PR3 and PR4 can be blocked by the connection $\overline{2}$ via the line 165 with the junctions 166 and 167, as can the priority line PR4 be blocked by the connection $\overline{3}$ by way of the line 168 and the junction 169.

Nevertheless, since the module 1 in the example selected is not an initiator, the connection $\overline{1}$ carries a "1", that is, the line 161 carries a "0" signal, with which the priority lines PR2-PR4 are potentially released. The same holds true for the modules 2-4 by way of the line 165 with the junctions 166 and 167, as well as the line 168 with the junction 169.

Therefore, if the module 2 is an initiator, then the module 4 can no longer be an initiator in the course of this priority test.

If the priority test set forth above is terminated and a priority line PR1-PR4 is released, then the output of the NOR gate 120 is set at "0", whereby a "1" signal arises at the output of the inverter 121. Following this, this "1" signal is clocked by the flip-flop 30, whereby the connection S is brought to a "0" by way of the inverter 34. If the status connection S is at "0", then the microcomputer network is in the communication mode. With this, the line 37 goes to "0", whereby the data lines D0-D4 are released. With this, information from the buffer 190 can be transmitted over these lines and, via the system bus CB, to the other modules.

Figure 3:
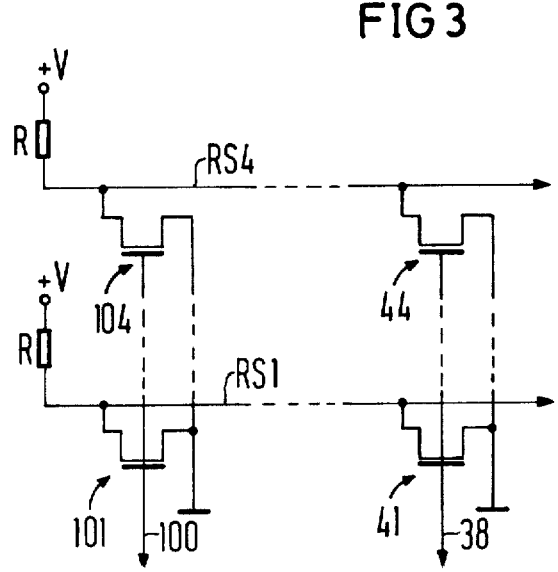
FIG. 3 illustrates a circuit arrangement for the switches employed in the testing circuit according to FIG. 2 for line activation.

FIG. 3 illustrates a practical embodiment of the junctions of the circuit arrangement illustrated in FIG. 2. More particularly, in FIG. 3 the junctions 41 and 44, formed by the line 38 from the flip-flop 36 and the resource lines RS1 and RS4 are illustrated, along with the junctions 101 and 104 which are formed by the line 100 from the Q output of the flip-flop 99 and the resource lines RS1 and RS4. The junctions are thereby formed by metal-oxide-semiconductor (MOS) transistors which function as switches, the source-drain path of which is connected between the corresponding lines and ground and the gates of which are selected by the corresponding flip-flops. The resource lines RS1 and RS4 in each case lie at a voltage +V by way of a respective resistor R. If the line 38 or the line 100 which extend from the flip-flops 36 and 99, respectively, carry a "0" signal, then the respective switching transistors are nonconducting and the voltage at the lines RS1 and RS4 is transmitted as a "1" signal by way of these lines. If the switching transistors become conductive through the application of a "1" signal, then the voltage is diverted toward ground, that is, the lines RS1 and RS4 carry a "0" signal. With this, the effects which were set forth above with the use of the schematically illustrated junctions result in the circuit according to FIG. 2.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a microcomputer network of the type in which a plurality of microcomputer modules are coupled to a least one system bus, the improvement comprising at least one test circuit in each module operable to perform a resource test and determine, for a module requiring access to the system bus as an initiator module, whether all other modules are ready for information transmission and to perform a priority test to determine the highest priority module when more than one module requests access to the system bus as initiator modules and when all modules are ready for information transmission, said test circuit comprising a plurality of first terminals equal in number to the number of modules in the network, said first terminals being connected to said system bus, a plurality of resource lines and a plurality of priority lines connectible to said first terminals, a second terminal connected to the system bus for receiving a first signal indicating said resource testing and a second signal indicating said priority testing, a third terminal connected to the system bus for receiving a third signal indicating information transmission and a fourth signal indicating no information transmission, a priority request line connectible to said second terminal, a plurality of information data lines connectible to said first terminals, an information transmission flag register including an input for receiving a fifth signal indicating termination of information transmission, and connected to said third terminal for providing said fourth signal in response to said fifth signal, a plurality of first switches connected to said information transmission flag register and operable to connect said resource lines to said first terminals, a plurality of said second switches connected to said information transmission flag register and operable to connect said priority lines to said first terminals, a plurality of third switches connected to said information transmission flag register and operable to connect said information data lines to said first terminals, an activity flag register including an input for receiving a sixth signal indicating a running operation of a respected module and a seventh signal indicating termination of such operation, a plurality of fourth switches connected to said activity flag register and operable to connect and disconnect said resource lines to said first terminals in response to said sixth and seventh signals, a module identification register including an input for receiving module identification signals, a plurality of fifth switches connected to said identification register and operable to connect said resource lines to said first terminals, a plurality of sixth switches connected to said module identification register and operable to connect said priority lines to said first terminals, a resource priority selection flag register including an input connected to said second terminal, a plurality of seventh switches connected to said resource priority flag register and operable to connect said resource lines to said first terminals in response to said first signal, a plurality of eighth switches connected to said resource priority flag register and operable to connect said priority lines to said first terminals in response to said second signal, a data input for receiving data signals, comparison logic means connected to receive data from said data input and signals at said first terminals, said data signals representing a combination of initiator and resource modules, and operable in response to successful resource testing to emit an eighth signal representing a successful resource test, a priority request flag register including a priority request input for receiving a ninth signal indicating an information transmission request and for receiving said eighth signal, a ninth switch connected to said priority request flag register and operable to connect the same to said second input to operate said resource priority flag register in response to said eighth signal to connect said priority request lines to said first terminals, and a plurality of tenth switches selectively connected to said priority lines to define module priority, said ninth switches connected to and selectively operated by the signals at said first terminals to switch the priority lines of all but the highest priority module in effect.

2. The improved microcomputer network of claim 1, comprising:
a plurality of NOR gates each having an input connected to a respective resource line, priority line and data line, and an output connected to a respective first terminal.

3. The improved microcomputer network of claim 2, comprising
another NOR gate including an output connected to said second terminal, a first input connected to one of said data lines and a second input connected to said priority request register via said ninth switch.

4. The improved microcomputer network of claim 1, wherein said comparison logic means comprises:
a plurality of flip-flops, one per system module, for receiving signal combinations indicating the initiator and resource conditions of the modules, a plurality of NOR gates respectively connected to said flip-flops and respectively connected to said first terminals, an additional NOR gate connected to said plurality of NOR gates for producing a priority request signal for said priority request flag register.

5. The improved microcomputer network of claim 4, comprising
a further NOR gate connected between each of said priority lines and said priority request flag register and said information transmission flag register for operating the latter after priority testing.

6. The improved microcomputer network of claim 4, wherein each of said switches comprises
a switching transistor including a first electrode connected to an operating potential via the respective resource line, priority line and data line, a second electrode connected to a reference potential and a control third electrode connected to the respective source of control.

* * * * *